United States Patent
Tu

(10) Patent No.: US 8,935,518 B2
(45) Date of Patent: Jan. 13, 2015

(54) ELECTRONIC DEVICE WITH UART AND INPUT CONTROL METHOD

(75) Inventor: Wen-Chong Tu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 174 days.

(21) Appl. No.: 13/447,297

(22) Filed: Apr. 16, 2012

(65) Prior Publication Data

US 2013/0151826 A1 Jun. 13, 2013

(30) Foreign Application Priority Data

Dec. 12, 2011 (CN) .......................... 201110412423.0

(51) Int. Cl.
*G06F 9/00* (2006.01)
*G06F 15/177* (2006.01)
*G06F 1/24* (2006.01)
*G06F 9/445* (2006.01)

(52) U.S. Cl.
CPC . *G06F 9/445* (2013.01); *G06F 1/24* (2013.01)
USPC ................. 713/1; 713/2; 713/100; 709/220

(58) Field of Classification Search
USPC .................................. 713/1, 2, 100; 709/220
See application file for complete search history.

(56) References Cited

U.S. PATENT DOCUMENTS

| 6,647,434 | B1* | 11/2003 | Kamepalli ...................... 710/14 |
| 2008/0288679 | A1* | 11/2008 | Bandholz et al. ............... 710/71 |
| 2009/0154088 | A1* | 6/2009 | Huang et al. ............. 361/679.33 |
| 2012/0137114 | A1* | 5/2012 | Tsai .................................. 713/2 |

* cited by examiner

*Primary Examiner* — Stefan Stoynov
(74) *Attorney, Agent, or Firm* — Novak Druce Connolly Bove + Quigg LLP

(57) ABSTRACT

An electronic device includes a BMC, a BIOS, and a UART connected to at least one external input device. The UART includes a number of registers. The BMC is connected to the UART to initialize the registers and is also connected to a south bridge and transmits a restarting signal to the south bridge when the BMC is restarted. The BIOS is connected to the UART and stores input from the input device to the registers, the BIOS is also connected to the south bridge and detects whether the BMC generates the restarting signal to the south bridge. The BIOS then enables or disables the registers to store or not to store the input from the external input device according to whether the BMC generates the restarting signal.

8 Claims, 2 Drawing Sheets

ELECTRONIC DEVICE WITH UART AND INPUT CONTROL METHOD

BACKGROUND

1. Technical Field

The present disclosure relates to electronic devices and, particularly to an electronic device with UART and an input control method for the UART.

2. Description of Related Art

An electronic device, such as a server, includes a baseboard management controller (BMC), an universal asynchronous receiver/transmitter (UART), and a basic input output system (BIOS). The BMC initializes the registers of the UART. When the electronic device runs in an operation system, such as the DOS system, the registers of the UART may be used to store input from an external input device connected to the UART, such as a keyboard, through the RS232 interface of the UART. However, if the BMC is controlled to be restarted, the BMC may initialize the registers of the UART while the registers stores input from the external input device, thus may result in the registers of the UART being disordered and may further result in the electronic device being unstable.

BRIEF DESCRIPTION OF THE DRAWINGS

The components in the drawings are not necessarily drawn to scale, the emphasis instead being placed upon clearly illustrating the principles of the present disclose. Moreover, in the drawings, like reference numerals designate corresponding parts throughout the several views.

DETAILED DESCRIPTION

The disclosure is illustrated by way of example and not by way of limitation. It should be noted that references to "an" or "one" embodiment in this disclosure are not necessarily to the same embodiment, and such references mean at least one.

Figure 1:
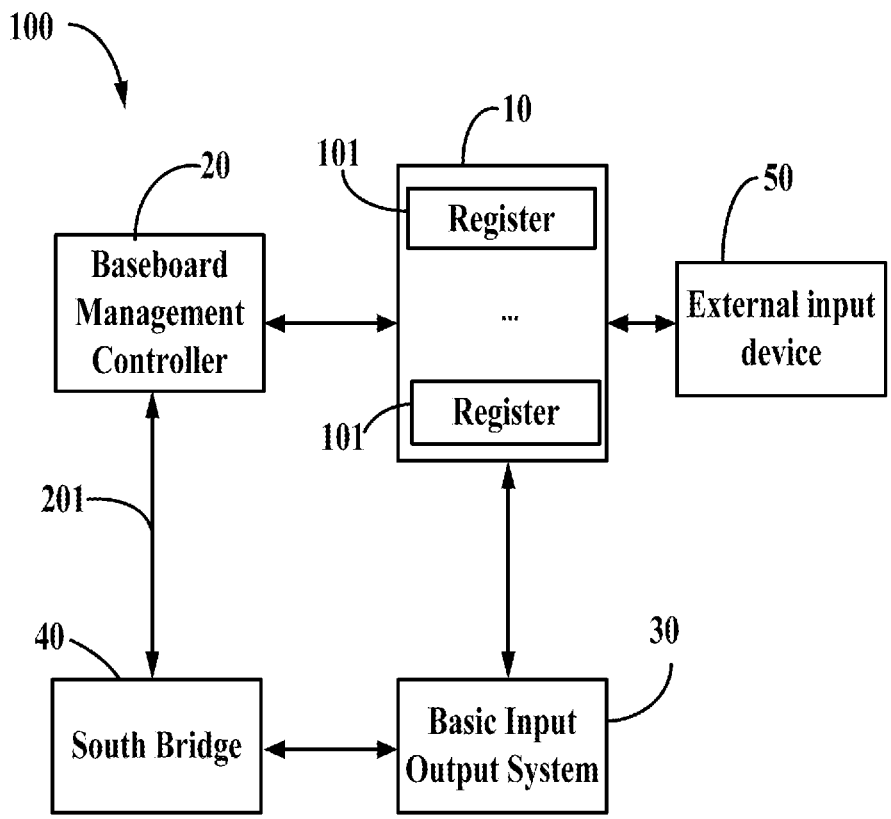
FIG. 1 is a schematic view showing connections among external components of an electronic device with a UART, in accordance with an exemplary embodiment.

FIG. 1 shows connections among external components of an electronic device 100. The device 100 includes a universal asynchronous receiver/transmitter (UART) 10, a baseboard management controller (BMC) 20, a basic input output system (BIOS) 30, and a south bridge 40.

The UART 10 includes a number of registers 101, and is connected to at least one external input device 50, such as a keyboard or a mouse. The input received from the external input device 50 is stored in the number of registers 101.

The BMC 20 is connected to the UART 10 for initializing the registers 101. The BMC 20 is further connected to the south bridge 40 by a general purpose input output (GPIO) interface 201, for transmitting a restarting signal to the south bridge 40 when the BMC 20 is restarted. In this embodiment, when the BMC 20 is powered on, the BMC 20 provides a logic high level to the south bridge 40, and when the BMC 20 is restarted, the BMC 20 provides a logic low level to the south bridge 40, wherein the logic low level is taken as a restarting signal.

The BIOS 30 is connected to the UART 10 for storing the input from the external input device 50 to the registers 101, and further connected to the south bridge 40 for detecting whether the BMC 20 generates a restarting signal. When the BMC 20 does not generate the restarting signal, the BIOS 30 enables the registers 101 to store the input from the external input device 50, and when the BMC 20 generates the restarting signal, the BIOS 30 disables the registers 101 not to store the input from the external input device 50. In this embodiment, when detecting the logic low level provided by the BMC 20 to the south bridge 40, the BIOS 30 disables the registers 101, and when detecting the logic high level, the BIOS 30 enables the registers 101.

Figure 2:
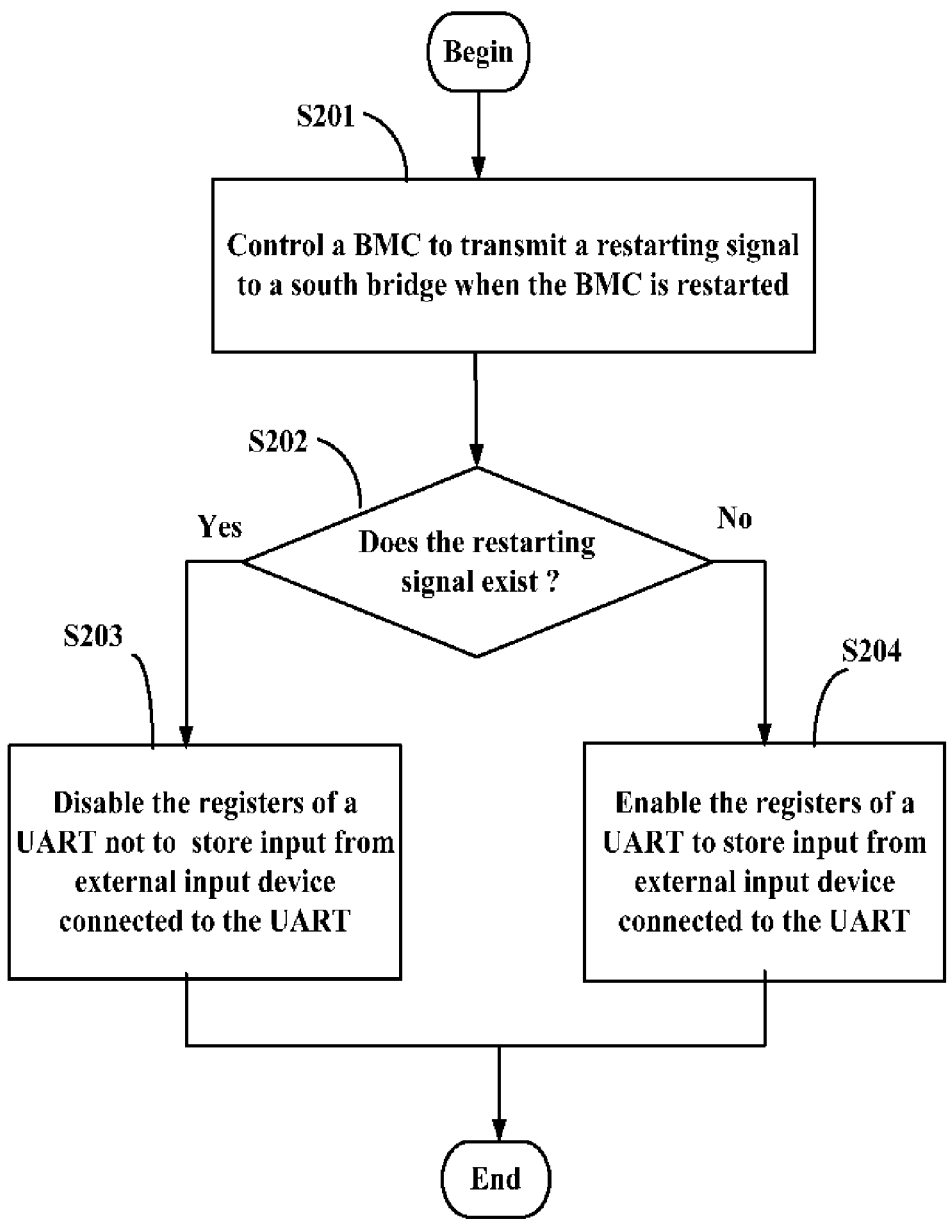
FIG. 2 is a flowchart of an input control method for controlling a UART of an electronic device to receive input from an external input device connected to the UART in accordance with an exemplary embodiment.

FIG. 2 discloses a flowchart of an input control method for controlling the UART 10 of the electronic device 100 to receive input from the external input device in accordance with an exemplary embodiment.

In step S201, the BMC 20 is controlled to transmit the restarting signal to the south bridge 40 when the BMC 20 is restarted.

In step S202, the BIOS 30 detects whether the BMC 20 generates the restarting signal. If the BMC 20 generates the restarting signal, the procedure goes to S203, otherwise, the procedure goes to step S204.

In step S203, the BIOS 30 disables the registers 101 not to store the input from the external input device 50.

In step S204, the BIOS 30 enables the registers 101 to store the input from the external input device 50.

In this embodiment, in step S201, when the BMC 20 is powered on, the BMC 20 provides the logic high level to the south bridge 40, and when the BMC 20 is restarted, the BMC 20 provides the logic low level to the south bridge 40. In step S202, when detecting the logic low level provided by the BMC 20 to the south bridge 40, the procedure goes to step S203, otherwise, the procedure goes to step S204.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
a south bridge;
a universal asynchronous receiver/transmitter comprising a plurality of registers, the universal asynchronous receiver/transmitter being connected to at least one external input device for storing input from the at least one external input device in the plurality of registers;
a baseboard management controller connected to the universal asynchronous receiver/transmitter to initialize the plurality of registers, the baseboard management controller being connected to the south bridge through a general purpose input output interface, for transmitting a restarting signal to the south bridge when the baseboard management controller is restarted; and
a basic input output system connected to the universal asynchronous receiver/transmitter for storing input inputted from the at least one external input device to the plurality of registers, and connected to the south bridge for detecting whether the baseboard management controller generates the restarting signal, wherein when the baseboard management controller does not generate the restarting signal, the basic input output system enables the plurality of registers to store the input from the at least one external input device, and when the baseboard management controller generates the restarting signal, the basic input output system disables the plurality of registers not to store the input from the at least one external input device.

2. The electronic device as described in claim 1, wherein when the baseboard management controller is powered on, the baseboard management controller provides a logic high level to the south bridge, and when the baseboard management controller is restarted, the baseboard management controller provides a logic low level to the south bridge.

3. The electronic device as described in claim 2, wherein when detecting the logic low level provided by the baseboard management controller to the south bridge, the basic input output system disables the plurality of registers.

4. The electronic device as described in claim 3, wherein when detecting the logic high level provided by the baseboard management controller to the south bridge, the basic input output system enables the plurality of registers.

5. An input control method, for controlling a universal asynchronous receiver/transmitter of an electronic device to receive input from at least one external input device connected to the universal asynchronous receiver/transmitter, the universal asynchronous receiver/transmitter comprising a plurality of registers, the electronic device comprising a baseboard management controller, a south bridge, and a basic input output system, the input controlling method comprising:

transmitting a restarting signal to the south bridge when the baseboard management controller is restarted;

detecting whether the baseboard management controller generates the restarting signal; and controlling the basic input output system to disable the plurality of registers not to store input from the at least one external input device when the baseboard management controller generates the restarting signal.

6. The input control method as described in claim 5 further comprising:

controlling the basic input output system to enable the plurality of registers to store the input from the at least one external input device when the baseboard management controller does not generate the restarting signal.

7. The input control method as described in claim 6, wherein the transmitting step further comprises:

providing a logic high level to the south bridge when the baseboard management controller is powered on, and providing a logic low level to the south bridge when the baseboard management controller is restarted.

8. The input control method as described in claim 7, wherein the detecting further comprises:

detecting whether the logic low level is provided by the baseboard management controller.

* * * * *